United States Patent
Guhl et al.

(10) Patent No.: US 11,193,511 B2
(45) Date of Patent: Dec. 7, 2021

(54) METHOD FOR MANUFACTURING A PISTON ROD UNIT AND A HOLLOW SHAFT

(71) Applicant: LIEBHERR-COMPONENTS KIRCHDORF GMBH, Kirchdorf (DE)

(72) Inventors: Christoph Guhl, Erolzheim (DE); Bernhard Müller, Rot an der Rot (DE)

(73) Assignee: LIEBHERR-COMPONENTS KIRCHDORF GMBH, Kirchdorf (DE)

( * ) Notice: Subject to any disclaimer, the term of this patent is extended or adjusted under 35 U.S.C. 154(b) by 79 days.

(21) Appl. No.: 16/311,382

(22) PCT Filed: Jun. 21, 2017

(86) PCT No.: PCT/EP2017/000723
§ 371 (c)(1),
(2) Date: Feb. 14, 2019

(87) PCT Pub. No.: WO2017/220202
PCT Pub. Date: Dec. 28, 2017

(65) Prior Publication Data
US 2019/0186507 A1    Jun. 20, 2019

(30) Foreign Application Priority Data
Jun. 21, 2016    (DE) ..................... 10 2016 007 593.7

(51) Int. Cl.
| | |
|---|---|
| *B23P 15/10* | (2006.01) |
| *F15B 15/14* | (2006.01) |
| *F16J 7/00* | (2006.01) |
| *B21J 5/02* | (2006.01) |
| *E02F 9/22* | (2006.01) |

(52) U.S. Cl.
CPC .......... *F15B 15/1457* (2013.01); *B21J 5/022* (2013.01); *B23P 15/10* (2013.01); *E02F 9/2271* (2013.01); *F16J 7/00* (2013.01); *B23P 2700/04* (2013.01)

(58) Field of Classification Search
CPC ... B23P 2700/04; B23P 2700/14; B23P 15/10; F16C 2220/46; F16C 2220/62; B21K 1/06; B60G 2206/81022; B21D 19/10; B21D 41/04; B21C 1/18; B21C 1/22; B21C 1/24; B21C 37/156; B21C 37/20
See application file for complete search history.

(56) References Cited

U.S. PATENT DOCUMENTS

| | | | |
|---|---|---|---|
| 1,383,002 A | 6/1921 | McIlvried | |
| 4,561,164 A * | 12/1985 | Wossner | B23P 15/10 |
| | | | 188/322.22 |
| 2014/0020228 A1* | 1/2014 | Janzen | F16F 1/14 |
| | | | 29/515 |

FOREIGN PATENT DOCUMENTS

| | | |
|---|---|---|
| DE | 8210371 U1 | 6/1982 |
| DE | 8308769 U1 | 9/1983 |

(Continued)

OTHER PUBLICATIONS

ISA European Patent Office, International Search Report Issued in Application No. PCT/EP2017/000723, dated Sep. 19, 2017, WIPO, 6 pages.

*Primary Examiner* — Christopher J Besler
(74) *Attorney, Agent, or Firm* — McCoy Russell LLP

(57) ABSTRACT

The invention relates to a method for producing a piston rod unit, or a shaft, in lightweight construction, with a rod which is hollowly-drilled by means of a deep bore into the rod shank, and the resulting rod opening is closed subsequently by means of a forging process.

12 Claims, 4 Drawing Sheets

(56) References Cited

FOREIGN PATENT DOCUMENTS

Figure 1:
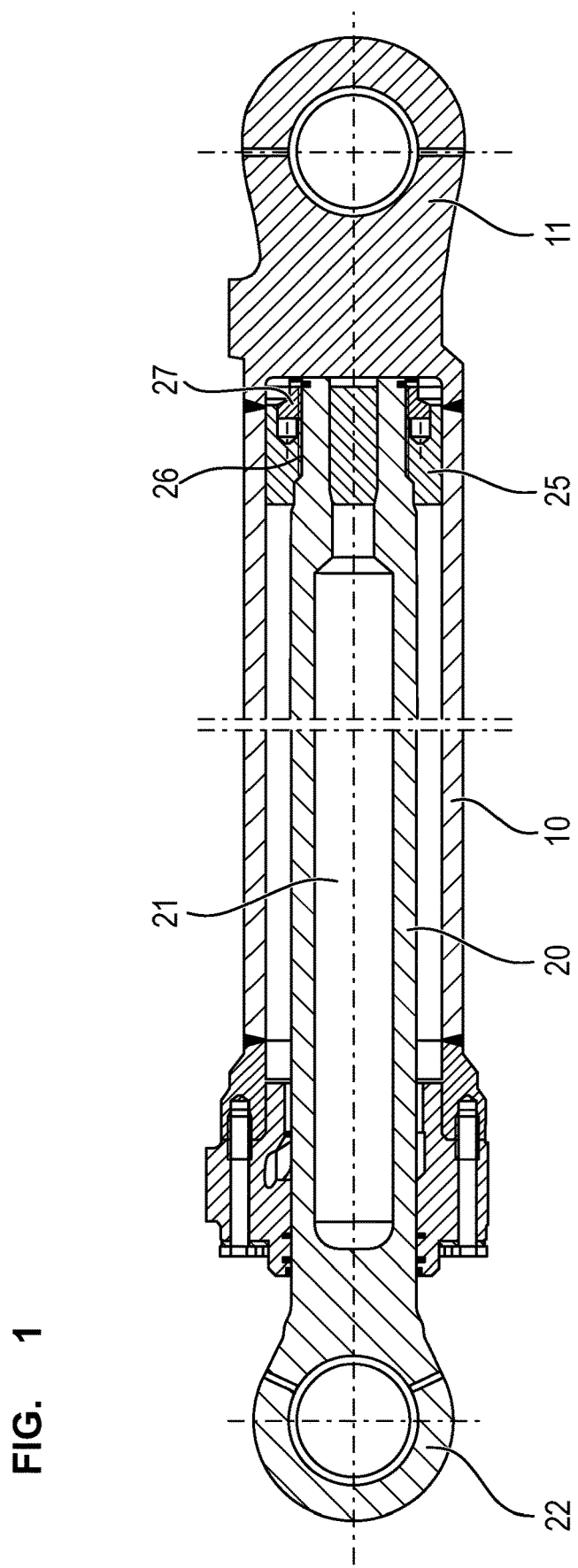

| | | | |
|---|---|---|---|
| DE | 10064365 | A1 | 7/2002 |
| DE | 202014006861 | U1 | 1/2015 |
| EP | 2148014 | A2 | 1/2010 |
| EP | 2455553 | A1 | 5/2012 |
| EP | 3001075 | A1 | 9/2015 |
| GB | 2087035 | A | 5/1982 |
| WO | 02052115 | A2 | 7/2002 |

* cited by examiner

METHOD FOR MANUFACTURING A PISTON ROD UNIT AND A HOLLOW SHAFT

CROSS-REFERENCE TO RELATED APPLICATIONS

The present application is a U.S. National Phase of International Patent Application Serial No. PCT/EP2017/000723 entitled "METHOD FOR MANUFACTURING A PISTON ROD UNIT AND A HOLLOW SHAFT," filed on Jun. 21, 2017. International Patent Application Serial No. PCT/EP2017/000723 claims priority to German Patent Application Serial No. 10 2016 007 593.7 filed on Jun. 21, 2016. The entire contents of each of the above-cited applications are hereby incorporated by reference in their entirety for all purposes.

The invention relates to a method for producing a piston rod unit in, as well as a shaft, which is produced in accordance with such a method.

Piston cylinder units, in particular hydraulic cylinders, are often used in large working machines. A predominant aim of the developers lies with the optimization of the workings machines in terms of overall weight, in order to not only save production costs, but likewise optimize the efficiency of operation of the machines. Although the piston rod units mounted in the hydraulic cylinders contribute only a relatively small part to the overall weight, but especially in large machine types, such as mining machines, significant weight savings can be achieved.

Most of the current developments aiming at a lightweight construction cylinder provide a hollow piston rod construction, but the attachment of the hollow piston rod, which often is a simple pipe element, is effected by means of screw- or weld connections to the piston rod head and the piston. The drawback of this approach lies with the extremely negative effect of these connection types on the dynamic stress resistance of the lightweight construction cylinder. For this purpose, steels tempered and quenched with refractory metals having increased carbon equivalents are in particular used, which achieve an increased strength due to the tempering and quenching of the steel, but can be welded poorly due to the solidified precipitation phase in the steel. For this reason, the use of hollow piston rod constructions, in particular in hydraulic piston rod units for mining machines, has not been possible so far, since the connection techniques used there on the basis of screw- and weld connections cannot be combined with lightweight construction.

The object of the present invention thus is to provide an improved manufacturing method for a piston rod unit, which allows an optimum lightweight construction in particular for mining machines.

This object is achieved by means of a method having the features of claim 1. Advantageous configurations of the method are the subject-matter of the dependent claims following the main claim.

According to the invention, it is proposed for the production of the piston rod unit, to first hollowly-drill a piston rod by means of deep-hole drilling in the rod shank in order to ensure the desired weight saving. The resulting rod opening of the deep-hole bore at the rod end is closed-off by means of a forging process afterwards. Using this measure, the resulting closed piston rod is also suitable for use in heavy mining machines since the rod opening closed by the forging process can be connected with the piston of conventional piston rod units in conventional ways and manners. In particular, the resulting piston rod can be connected with the piston through a simple screw-connection. Open-die forging has proven as a suitable forging method.

It is particularly advantageous when the piston rod, including the piston rod head is mechanically formed from a blank. By contract to the prior art, piston rod and piston rod head are to be understood as a one-piece component, possible connections between the two sections of the piston rod are omitted.

In the mechanical processing of the piston rod from a blank, preferably, provision is made for a process so that a material excess remains at the rod end of the piston rod. In particular, a material excess is left in the radial direction at the piston-side end of the tube-shaped piston rod. This material excess, in a corresponding thermo-mechanical stress during the forging process, is ideally used to block the bore openings resulting from the deep bore. The material excess is consequently made to flow, due to the thermo-mechanical stress, in the radial direction of the cylinder. As a result, it is possible to close the bore opening at the rod end without having to employ other connection techniques that have a negative effect on the dynamic stress resistance of the cylinder.

According to an advantageous embodiment of the method according to the invention, a mandrel is inserted into the deep bore prior to the beginning forging process, in particular in the region of the bore opening at the rod end. By means of the inserted mandrel, a precise closing of the bore opening in the forging can be achieved, and thus a complete sealing of the cavity of the piston rod. Moreover, the entering material flow can be controlled in better ways during the forging process. In some aspects, the mandrel may be removed after the forging process.

The inserted mandrel can be in the type of a cylinder with a sharply-tapering end. However, other geometrical shapes are also conceivable.

The mandrel can have a smooth surface structure. Alternatively, the mandrel surface may also provide a non-smooth structure, e.g. with a wave-shaped or another non-smooth profile. For example, the mandrel may have a non-smooth, cone-type surface structure. The quality of the closure can be improved by means of a non-smooth surface structure of the mandrel. As a result, it is ensured that the internal cavity is sealed, during each operating situation, against the intrusion of the non-compressible hydraulic medium.

Advantageously, the bore end, i.e. the bore closing-off that ends in the piston rod shank, is of radial shape. An otherwise edged bore-cross-section at the bore end could lead to a potential notching effect.

The following assembly of the produced piston rod and a piston is for example exclusively based upon a screw connection. As a result, potential weld connections inside the piston rod can be completely dispensed with, which leads to a significantly higher dynamic stress resistance of the entire piston rod unit. Since, by this approach, the stress resistance of the unit is optimized, higher weight savings can be realized in the manufacture in the end.

Besides the method according to the invention, the present invention also relates to a piston rod unit that has been produced in accordance with such a method. The piston rod unit thus provides the same advantages and properties as have been explained in more detail above by means of the method according to the invention. For this reason, a repeated description is omitted.

Furthermore, the invention relates to the use, according to the invention, of the piston rod unit in accordance with the present invention for a mining apparatus, in particular for a mining excavator, ideally as a bucket cylinder.

Moreover, the present invention relates to a mining apparatus, in particular a mining excavator with at least one piston rod unit, which is characterized in that the installed piston rod of the piston rod unit is of hollow design. Advantageously, the piston rod unit has been manufactured in accordance with the method according to the invention. The mining apparatus is thus characterized by the same advantages and properties as have already been explained with reference to the method according to the invention.

Figure 2:
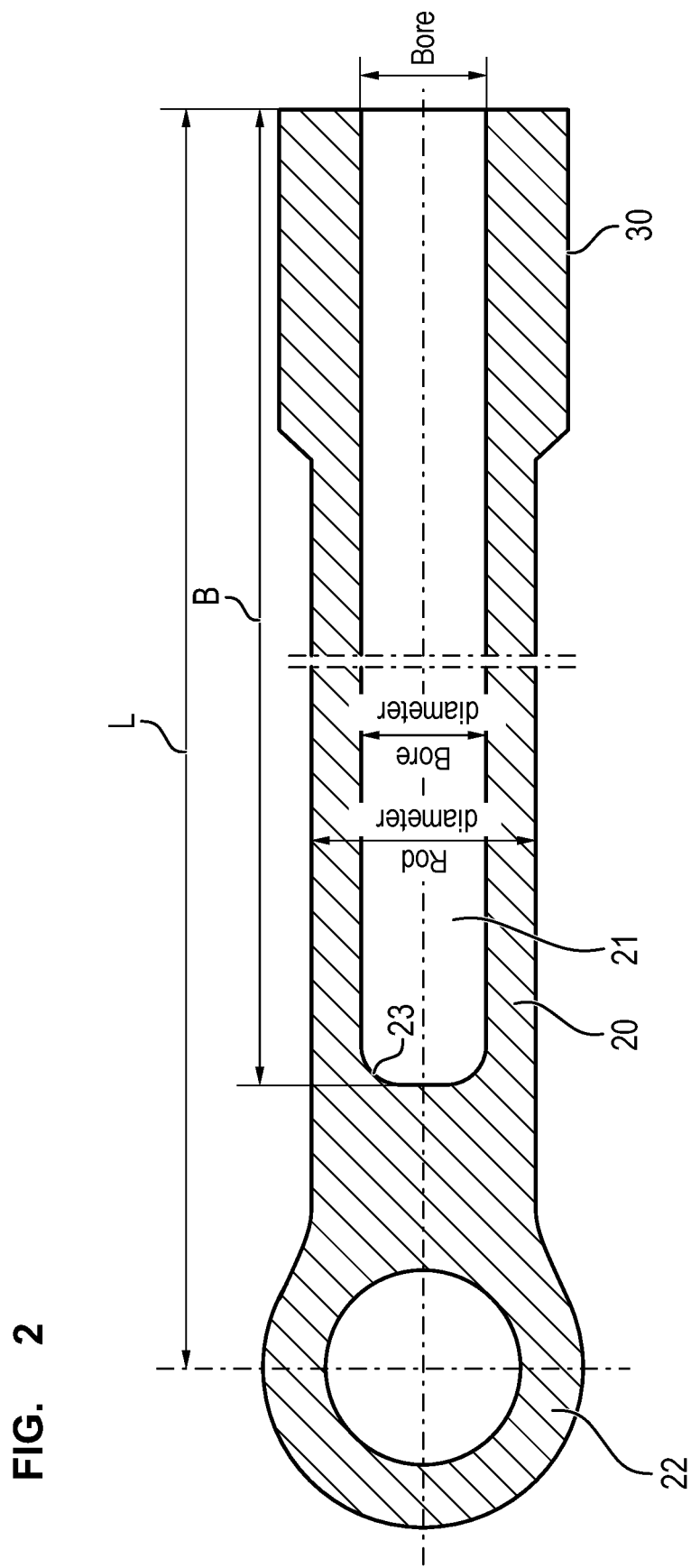
Figure 3:
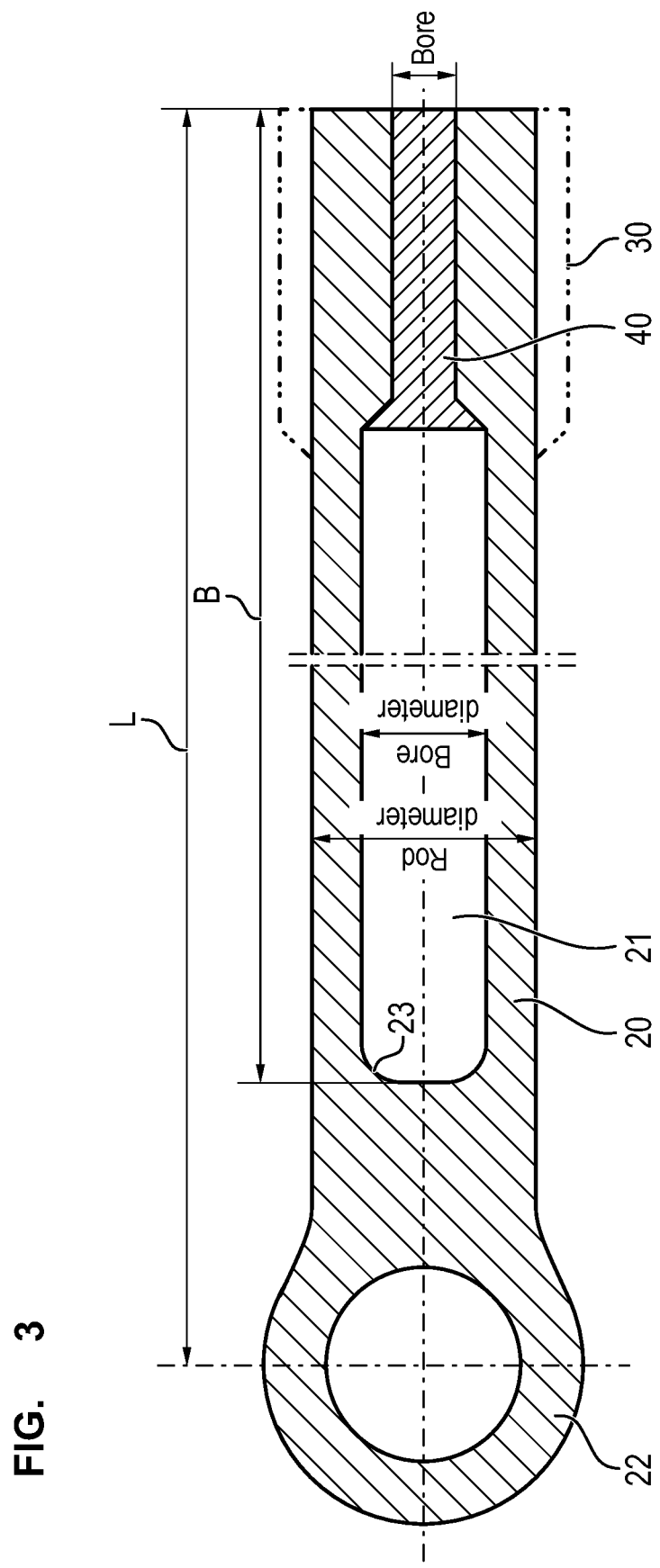
Figure 4:
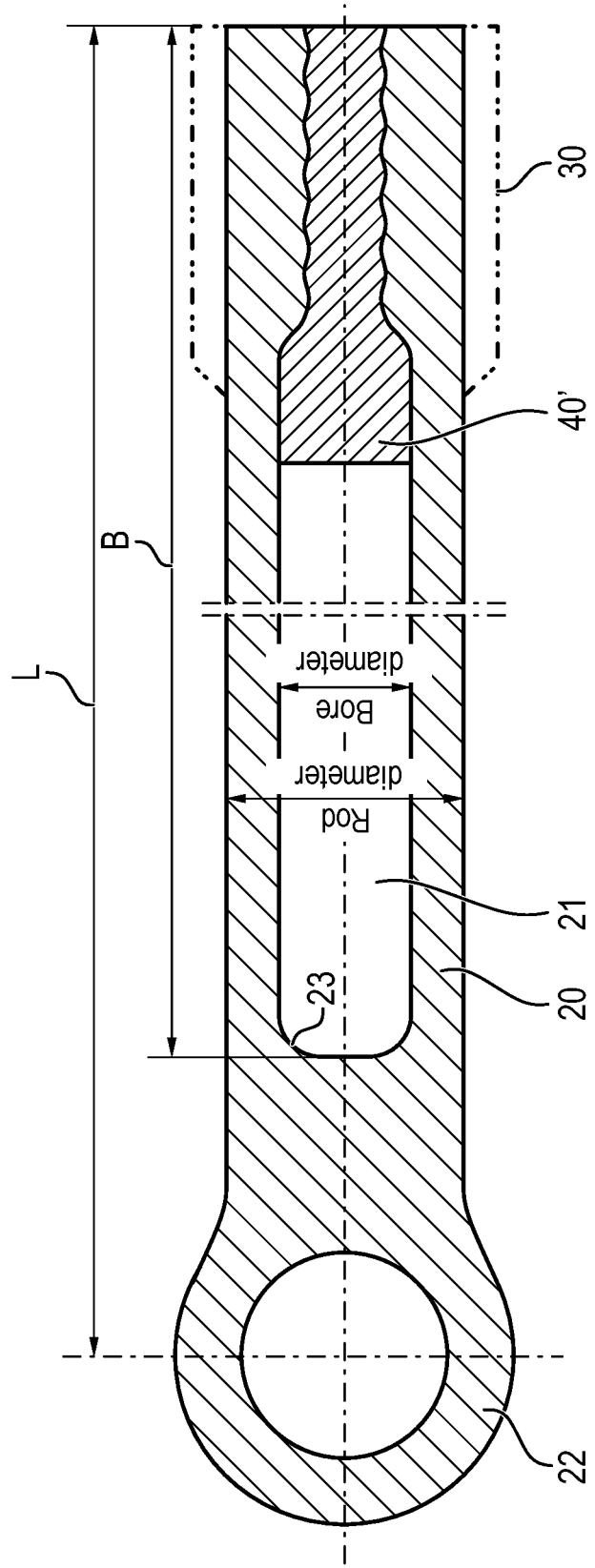

Further advantages and properties of the invention are to be explained in greater detail by means of an exemplary embodiment shown in more detail in the drawings. The Figures show in:

FIG. 1: a hydraulic cylinder according to the invention, with a novel piston rod, FIG. 2: an image of an intermediate product in the manufacture according to the invention of the piston rod, FIG. 3: the piston rod according to FIG. 2 after the effected forging process, and FIG. 4: the piston rod according to FIG. 2 after the effected forging process in accordance with an alternative configuration.

The invention proposes a manufacturing method of a hydraulic cylinder in lightweight construction. An advantage of the construction according to the invention consists in that potential weld connections inside the piston rod can be completely dispensed with and required screw connections are reduced to only one connection point between piston rod and piston. FIG. 1 shows a completely-assembled hydraulic cylinder in the form of a differential cylinder that has been produced in accordance with the method according to the invention. The hydraulic cylinder includes the cylinder housing 10 with the piston rod 20 including piston 25 displaceably mounted therein. The piston 25 is screwed to the piston rod end located in the cylinder 10 by means of a screw connection 26. Part of the screw connection is the thread of the piston nut 27 located inside the piston 25.

At the piston rod head 22, a boss for mounting the piston rod unit is provided. The same applies to the closed cylinder end. To achieve lightweight construction, the piston rod 20 comprises a deep bore 21, which extends in the longitudinal direction from the piston rod head 22 to the mounted piston 25.

The manufacturing process of the piston rod unit first provides, in a first step, to produce the piston rod 20 including piston rod head 22 from a blank in mechanical ways and manners. The piston rod 20 and the piston rod head 22 are consequently made from one and the same starting material, and are to be considered as a one-piece end product. Furthermore, during the machining process, a radial material excess 30 is left at the rod end of the piston rod 20.

After that, the deep bore 21 is made from the rod end in the direction of the rod head 22 with the bore length B. The inner end 23 of the deep bore 21 is of radial shape, in order to thereby prevent a possible notch effect by means of an edged bore cross-section. The resulting intermediate product is shown by FIG. 2. The piston rod has a length L.

The protruding material 30 is used, after the deep hole drilling 21, to close the bore opening at the rod shank. This is effected by means of open-die forging or another, suitable forging process. In the forging process, the protruding material 30 is made to flow, due to the thermo-mechanical stress, in the radial direction of the cylinder. As a result, it is possible to close the bore opening at the rod shank without having to use other connection techniques that have a negative effect on the dynamic stress resistance.

Prior to the forging, a type of mandrel 40 can be laid into the bore 21 (see FIG. 3), in order to be able to close and seal the bore opening precisely and, on the other hand, be able to control the material flow during the forging in better ways and manners. The proposed method further allows acting more freely both in terms of the material selection and the bore dimensions. This particularly means that the yield in terms of weight reduction can be increased due to the prevented weaknesses that might develop due to previous connection techniques. In large cylinders for the field of mining, up to 400 KG can be saved.

In a further configuration, as shown in FIG. 4, it is also conceivable to configure the geometry of the mandrel 40' in a wave-like or other non-smooth form, in order to thereby increase the quality of the closure. The internal cavity should be sealed against the entering of the non-compressible medium in each operating situation.

The invention claimed is:

1. A method for producing a piston rod unit in lightweight construction, comprising:
   deep-hole drilling a rod shank of a piston rod of the piston rod unit to form a deep bore, wherein during drilling, a material excess is left at a rod end of the piston rod, wherein the rod end of the piston rod having the material excess has a greater thickness than an immediately adjacent section of the piston rod;
   closing an opening of the deep bore by a forging process wherein the material excess closes the opening of the deep bore due to thermo-mechanical stress during the forging process;
   wherein the piston rod is form-fittingly connected with a piston of the piston rod unit exclusively via an external connection type.

2. The method according to claim 1, wherein the piston rod, including a piston rod head, is mechanically formed from a blank.

3. The method according to claim 1, wherein a mandrel is inserted into the opening of the deep bore prior to the forging process.

4. The method according to claim 3, wherein the inserted mandrel has a non-smooth, cone-type surface structure.

5. The method according to claim 3, wherein the inserted mandrel has a smooth surface structure.

6. The method according to claim 3, wherein the mandrel is removed after the forging process.

7. The method according to claim 1, wherein an end of the deep bore located in the piston rod shank is of radial shape.

8. The method according to claim 3, wherein the mandrel is inserted into the opening of the deep bore at the rod end of the piston rod.

9. The method according to claim 1, wherein the external connection type is a screw connection.

10. The method according to claim 2, wherein the piston rod and the piston rod head are a one-piece component.

11. The method according to claim 2, wherein the deep bore extends in a longitudinal direction from the piston rod head to the rod end of the piston rod.

12. The method according to claim 1, wherein the material excess is flowed in a radial direction of a cylinder of the piston rod unit.

* * * * *